US 8,086,265 B2

United States Patent
White

(10) Patent No.: US 8,086,265 B2
(45) Date of Patent: Dec. 27, 2011

(54) MOBILE DEVICE INTERFACE AND METHODS THEREOF

(75) Inventor: Scott White, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 720 days.

(21) Appl. No.: 12/173,666

(22) Filed: Jul. 15, 2008

(65) Prior Publication Data

US 2010/0016014 A1    Jan. 21, 2010

(51) Int. Cl.
*H04M 1/00* (2006.01)

(52) U.S. Cl. ............ 455/556.1; 455/567; 455/566; 455/457; 379/387.01; 340/856.3

(58) Field of Classification Search ............ 455/556.1, 455/567, 566, 457, 158.4, 3.06; 379/387.01, 379/390.03; 340/856.3, 856.4
See application file for complete search history.

(56) References Cited

U.S. PATENT DOCUMENTS

| | | | | |
|---|---|---|---|---|
| 5,852,769 A * | 12/1998 | Ahmed et al. | ............ | 455/116 |
| 6,163,711 A * | 12/2000 | Juntunen et al. | ............ | 455/557 |
| 6,701,144 B2 | 3/2004 | Kirbas et al. | | |
| 6,912,386 B1 * | 6/2005 | Himberg et al. | ............ | 455/423 |
| 7,079,645 B1 * | 7/2006 | Short et al. | ............ | 379/388.03 |
| 7,158,173 B2 * | 1/2007 | Lee et al. | ............ | 348/222.1 |
| 7,221,386 B2 * | 5/2007 | Thacher et al. | ............ | 348/14.02 |
| 7,317,911 B2 * | 1/2008 | Brenig et al. | ............ | 455/418 |
| 7,469,155 B2 * | 12/2008 | Chu | ............ | 455/567 |
| 7,529,545 B2 * | 5/2009 | Rader et al. | ............ | 455/432.2 |
| 7,636,444 B2 * | 12/2009 | Cronin | ............ | 381/57 |
| 2003/0078081 A1 * | 4/2003 | Schmier | ............ | 455/567 |
| 2005/0073575 A1 * | 4/2005 | Thacher et al. | ............ | 348/14.13 |
| 2005/0096753 A1 * | 5/2005 | Arling et al. | ............ | 700/11 |
| 2006/0116175 A1 * | 6/2006 | Chu | ............ | 455/567 |
| 2007/0037610 A1 | 2/2007 | Logan | | |
| 2007/0253578 A1 * | 11/2007 | Verdecanna et al. | ............ | 381/104 |
| 2008/0113657 A1 * | 5/2008 | Abu-Amara et al. | ............ | 455/415 |
| 2009/0079547 A1 * | 3/2009 | Oksanen et al. | ............ | 340/10.3 |
| 2009/0106029 A1 * | 4/2009 | DeLine et al. | ............ | 704/275 |
| 2010/0166196 A1 * | 7/2010 | Chen et al. | ............ | 381/57 |
| 2011/0019991 A1 * | 1/2011 | Lee et al. | ............ | 396/164 |

OTHER PUBLICATIONS

"Mobile Apps: Adjust Your Ring Volume for Ambient Noise," Chris Mitchell, MSDN Magazine, Oct. 2007, http://msdn.microsoft.com/en-us/magazine/cc163341.aspx.
"Windows Mobile: Adjust Ring Volume According to the Ambient Noise Level," Oct. 11, 2007, The Official Blog of MSDN Magazine, http://blogs.msdn.com/msdnmagazine/archive/2007/10/11/5384468.aspx.

* cited by examiner

*Primary Examiner* — Minh D Dao

(74) *Attorney, Agent, or Firm* — Moazzam & Associates, LLC

(57) ABSTRACT

A mobile communication device is configured to sense a plurality of ambient characteristics using a plurality of sensors. In an embodiment, one or more of the plurality of sensors, such as microphone or camera, can be used for other functions of the mobile communication device. The mobile communication device adjusts one or more user interface characteristics of the mobile communication device based on the sensed plurality of ambient characteristics. The mobile communication device thereby provides for automatic adjustment of various user interface characteristics based on the ambient conditions of the environment around the mobile communication device.

23 Claims, 4 Drawing Sheets

MOBILE DEVICE INTERFACE AND METHODS THEREOF

FIELD OF THE DISCLOSURE

The present disclosure generally relates to mobile communication devices.

BACKGROUND

The use of mobile communication devices, such as cellular telephones, has increased greatly in recent years. Further, the uses for mobile communication devices have seen a commensurate increase. For example, a single mobile communication device can be employed as a telephone, a camera, a personal data recorder, and a web browser. This increase in device applications has led to an increase in the number of environments where the mobile communication device is used. For example mobile communication devices are now frequently carried at home, work, school, the movie theater, and elsewhere.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
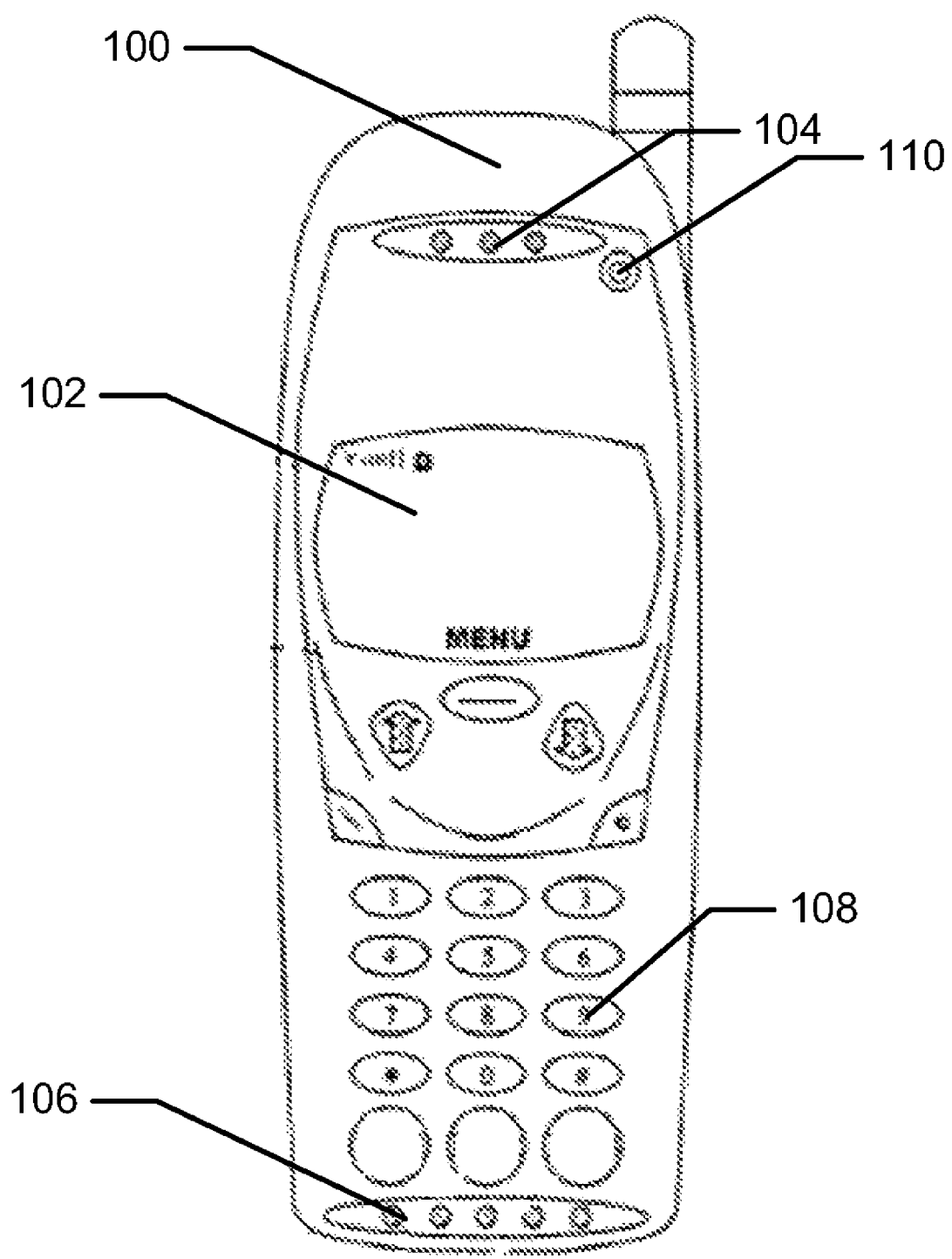
FIG. 1 shows a mobile communication device according to one embodiment of the present disclosure.

FIG. 1 shows a mobile communication device 100 in accordance with one embodiment of the present disclosure. In the illustrated embodiment of FIG. 1, the mobile communication device 100 is a cellular telephone configured to communicate with other cellular phones via a network. In other embodiments the mobile device can be a personal data assistant, handheld computer, and the like. The mobile device 100 includes a display 102, a speaker 104, a microphone 106, a set of buttons 108 and a camera 110.

The display 102, microphone 106, speaker 104, and buttons 108 are examples of user interface devices. As used herein, a user interface device is a device that provides information to or receives information from a user to interact with the mobile device 100. Accordingly, a user interface device can be a device that provides information to a user, such as the display 102 or the speaker 104, or can be a device, such as the buttons 108 or the microphone 106, that allows the user to provide information to the mobile device 100.

The display 102 is configured to display designated information, such as phone numbers, contact lists, web pages, games, and the like. In the illustrated embodiment the display 102 includes a set of pixels, whereby each pixel is set to a designated color in order to display the information. In addition, the display 102 is configured to have a variable brightness, such that the mobile device 100 can select a brightness of the display from a plurality of available brightness settings. In one embodiment, the mobile device 100 sets the brightness of the display 102 by adjusting a backlight of the display.

The speaker 104 is configured to render audio information provided by the mobile device 100 so that the information is audible to the user. Examples of audio information include voice information provided during a phone call, a ring to indicate an incoming phone call or alarm, or the like. In an embodiment, the volume associated with the speaker is adjustable by the mobile device 100.

The microphone 106 is an audio sensor configured to provide audio information to the mobile device 100. In the illustrated embodiment, the audio information can include audio input from the user, such as the user's voice provided during a phone call. In addition, the microphone 106 can provide audio information based on the ambient noise around the mobile device 100.

The buttons 108 are configured to provide an interface for the user to enter information, such as phone numbers, text information, or the like to the mobile device 100. In an embodiment, the buttons 108 are capable of being illuminated, individually or as a group. The brightness of the button illumination is adjustable by the mobile device 100.

The camera 110 is a device configured to receive light information, and to record pictures based on the received light information. In particular, the camera 110 includes an optical sensor configured to record incoming light information, including color, contrast, and other light information. The received information can be recorded as pictorial information. In addition, the received information can be used to determine the ambient light in the surrounding environment of the mobile device 100.

In operation, the mobile device 100 is configured to determine ambient characteristics of the device based on sensors at the camera 110, microphone 106, and other sensors. As used herein, an ambient characteristic refers to a characteristic of the environment around the mobile device 100, and can include ambient sound, ambient light, geographic location, ambient temperature, or the like. Based on the sensed ambient characteristics, the mobile device 100 can adjust one or more user interface characteristics of the device. As used herein, a user interface characteristic refers to a characteristic of a user interface device that is perceptible to the user. Examples of user interface characteristics include display brightness, speaker volume, microphone sensitivity, button lighting, ring volume, ring tone, or the like.

By automatically adjusting one or more user interface characteristics based on sensed ambient characteristics, the mobile device 100 can provide an improved user experience. For example, the mobile device 100 can adjust the brightness of the display 102 based on ambient light sensed via the camera 110. Thus, when the user enters a darker or brighter environment, the brightness of the display 102 is automatically adjusted, maintaining or improving readability of displayed information. Further, the mobile device 100 can change a ring volume or ring tone of the mobile device 100 based on the ambient sound sensed at the microphone 106. Thus, when the user enters a quiet location, such as a place of worship or theater, the ring tone can be automatically adjusted to a silent or vibrate setting. Automatic adjustment of user interface characteristics based on sensed ambient characteristics thereby reduces the need for the user to manually adjust the interface characteristics for different environments, resulting in an improved user experience.

In an embodiment, the mobile device 100 is configured to adjust a user interface characteristic based on multiple sensed ambient characteristics. For example, the mobile device 100 can adjust the ring volume or ring tone based on sensed ambient sound and on sensed ambient light. By basing adjustment of the user interface characteristic on more than one sensed ambient characteristic, the flexibility and accuracy of the adjustments can be improved. For example, by basing ring volume on both sensed ambient light and sensed ambient sound, the mobile device 100 is more likely to adjust the ring volume in appropriate situations.

Thus, for example, if the mobile device 100 were to adjust the ring volume based only on ambient sound, the ring volume may be adjusted in undesirable situations, such as brief lulls in ambient sound. By basing the ring volume on both ambient light and ambient sound, it is more likely that the mobile device 100 will adjust the ring volume in appropriate situations, such as when the user enters a darkened, silent theater or church.

As another example, the mobile device 100 can adjust a ring volume based on a geographic position of the device as sensed by a Global Positioning System (GPS) sensor. Thus, if the GPS sensor indicates that the mobile device 100 is in a geographic location corresponding to a theater, the mobile device 100 can adjust the ring volume to a silent mode. However, the ambient light may indicate that a silent mode is not necessary (e.g. if the theater lights are illuminated prior to the start of a movie). Thus, the mobile device 100 can adjust the ring volume based on both geographic location and ambient light, so that the ring volume is not adjusted until it is appropriate.

Figure 2:
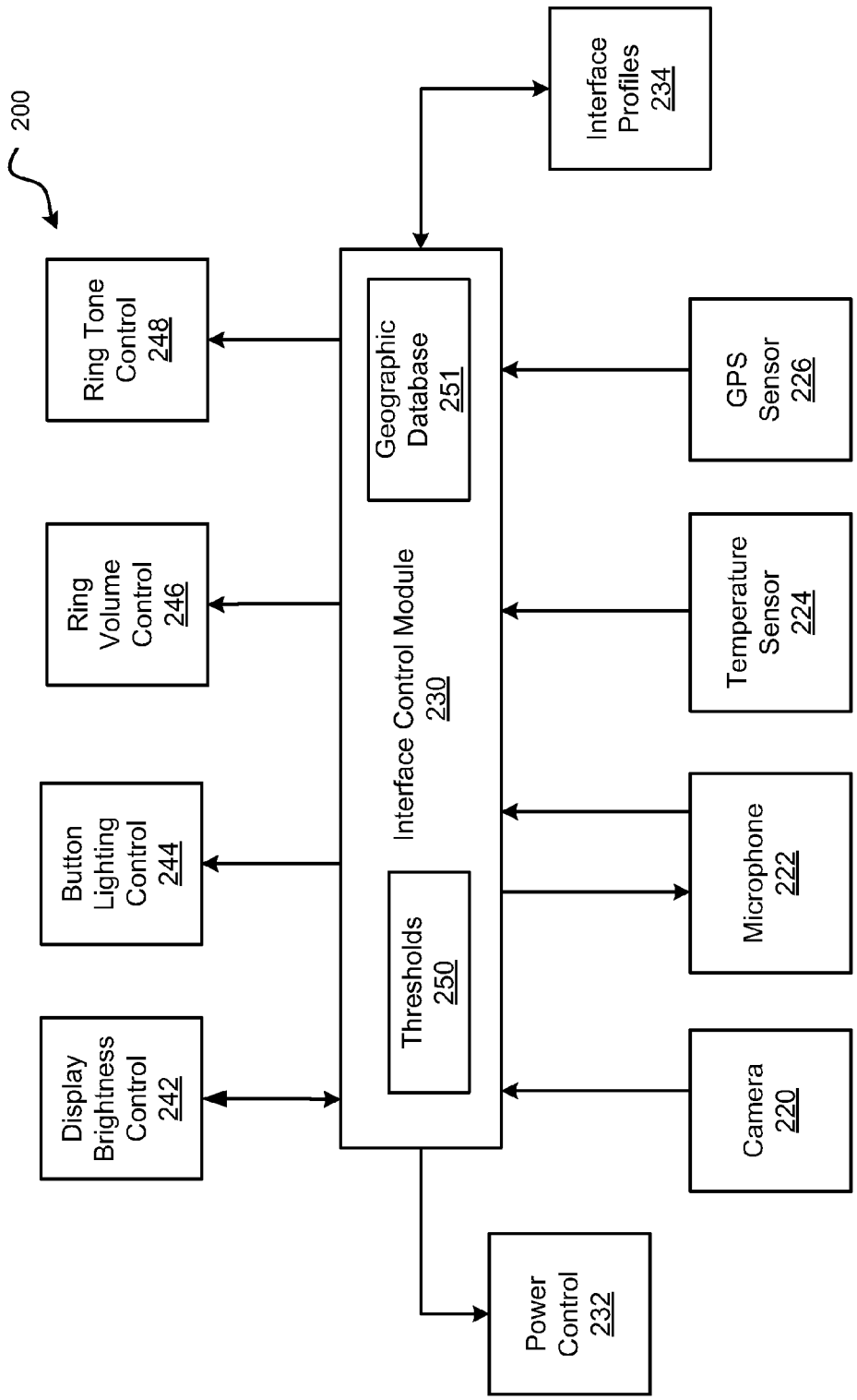
FIG. 2 is a block diagram of a particular embodiment of the mobile communication device of FIG. 1.

FIG. 2 illustrates a particular embodiment of a mobile device 200, corresponding to the mobile device 100 of FIG. 1. The mobile device 200 includes a set of ambient characteristic sensors, including a camera 220, a microphone 222, a temperature sensor 224, and a GPS sensor 226, each connected to an interface control module 230. The mobile device 200 also includes a number of control modules for user interface devices, including a display brightness control module 242, a button lighting control module 244, a ring volume control module 246, and a ring tone control module 248, each of which is connected to the interface control module 230. The mobile device 200 further includes a power control module 232 and interface profiles 234, each connected to the interface control module 230.

The camera 220, the microphone 222, the temperature sensor 224, and the GPS sensor 226 are each configured to sense an ambient characteristic of the mobile device 200, and to provide information indicative of the sensed characteristic to the interface control module 230. Thus, for example, the camera 220 can provide information indicative of ambient light, the microphone 222 can provide information indicative of ambient sound, the temperature sensor 224 can provide information indicative of ambient temperature, and the GPS sensor can provide information indicative of a geographic location of the mobile device 200.

The display brightness control module 242, button lighting control module 244, ring volume control module 246, and ring tone control 248 are each configured to receive control information from the interface control module 230 and to adjust a user interface characteristic of the mobile device 200 based on the control information. Thus, the display brightness control module 242 can adjust a brightness of a display device, while the button lighting control module 244 can turn a set of button lights on or off, or adjust the brightness of the button lights. The ring volume control module 246 can adjust a ring volume for the mobile device 200, while the ring tone control module 248 can set a ring tone of the mobile device based on the received control information. In addition, the microphone 222 can be configured to have an adjustable sensitivity, and to adjust the sensitivity based on control information received from the interface control module.

The power control module 232 is configured to set a power mode of the mobile device 200 based on control information received from the interface control module 230. In an embodiment, the power control module can place the mobile device in an active or normal mode, a low-power or sleep mode, or a shutdown mode based on the received control information.

The interface profiles 234 include one or more profiles indicating particular settings for user interface characteristics of the mobile device 200. Thus, an interface profile can indicate a particular ring tone, display brightness, and microphone sensitivity. In an embodiment, the interface profiles are user programmable, so that user can set particular user interface characteristics for particular ambient characteristics.

The interface control module 230 is configured to receive information from the camera 220, microphone 222, temperature sensor 224, and GPS sensor 226 indicating the ambient characteristics of the mobile device 100. Based on the received information, the interface control module 230 provides control information to one or more of the display brightness control module 242, button lighting control module 244, ring volume control module 246, ring tone control module 248, and microphone 222 to adjust one or more user interface characteristics of the mobile device 200. In particular, the interface control module 230 stores a set of thresholds 250 that indicate ambient characteristic thresholds. For example, the thresholds 250 can indicate an ambient temperature threshold, ambient sound threshold, ambient light threshold, and the like. The interface control module 230 compares received ambient characteristic information with the thresholds 250. Based on the comparison, the interface control module selects one of the interface profiles 234. Based on the selected interface profile, the interface control module 230 provides control information to set the user interface characteristics for the mobile device 100.

In addition, based on the selected interface profile, the interface control module 230 can provide control information to the power control module 232 to change a power mode for the mobile device 100. For example, in response to the temperature sensor 224 providing information indicating that the ambient temperature has risen above or below a threshold level, the interface control module 230 can provide control information to place the mobile device 100 in a low-power mode.

The interface control module includes a geographic database 251 configured to store information indicating location types associated with particular geographic location data. Thus, for example, the geographic database 251 can indicate whether a particular geographic location is associated with a theater, church, business, home, or the like. In an embodiment, the geographic database is user-programmable, allowing the user to associate particular locations with particular location types. Thus, the user can associate a particular location with a theater, restaurant, home, workplace, or the like.

In response to receiving geographic information from the GPS sensor 226, indicating a location of the mobile device 200, the interface control module 230 accesses the geographic database to determine a location type associated with the received geographic information. Based on the determined location type, the interface control module 230 can provide control information to set one or more user interface characteristics for the mobile device 200.

Figure 3:
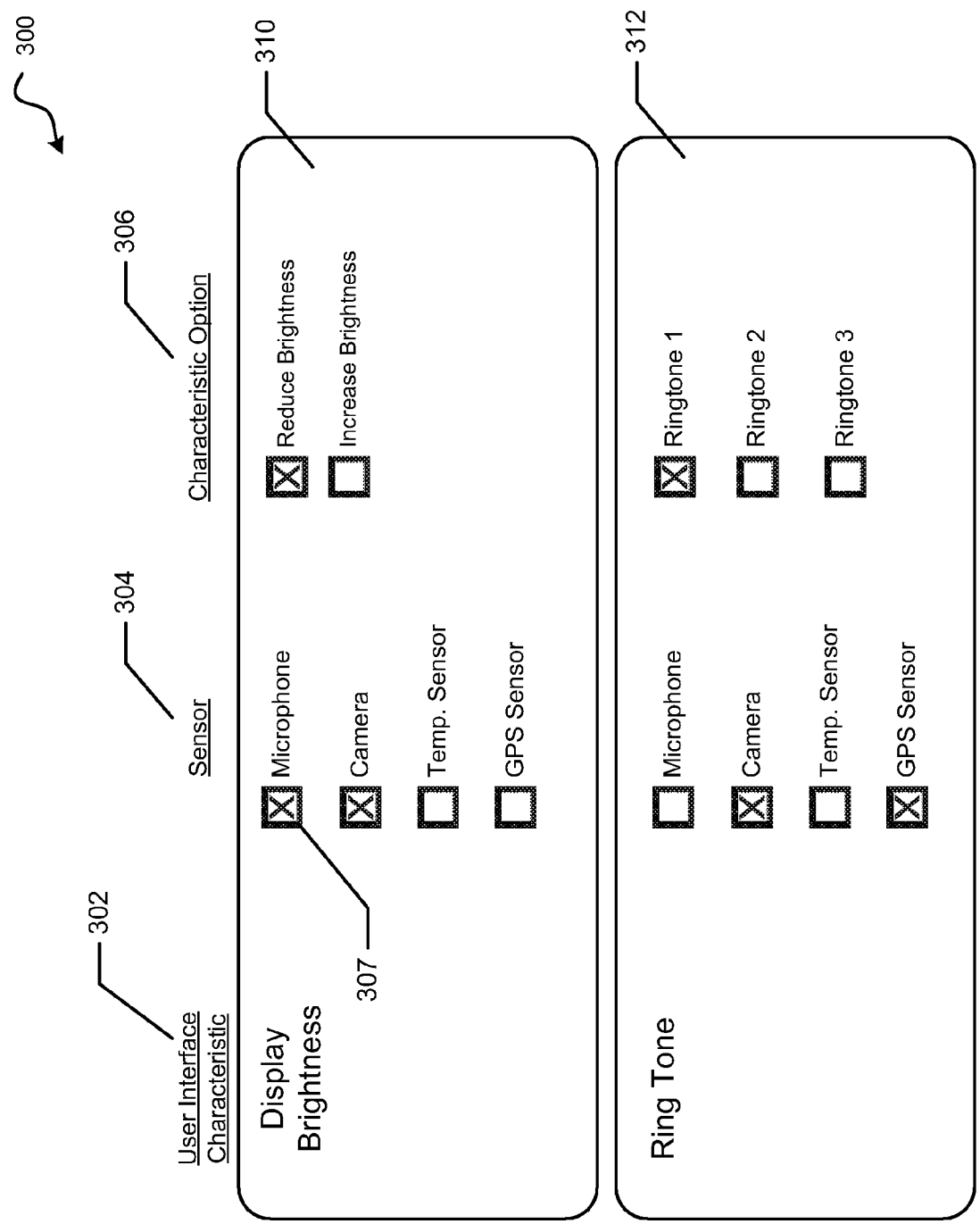
FIG. 3 is a diagram illustrating a graphical user interface for a mobile communication device in accordance with one embodiment of the present disclosure.

FIG. 3 illustrates a particular embodiment of a graphical user interface (GUI) 300 configured to allow the user to set or adjust one or more of the interface profiles 234 of FIG. 2. The GUI 300 can be displayed via the display 102 (FIG. 1), and the user can interact with the GUI 300 by manipulation of the buttons 108 (FIG. 1). In another embodiment, the display 102 can be a touch-screen display that allows the user to interact physically with the displayed GUI 300.

The GUI 300 includes panels 310 and 312, each of which is associated with a designated user interface characteristic. In particular, each of the panels 310 and 312 includes a number of fields, including a user interface characteristic field 302, a sensor field 304, and a characteristic option field 306. The user interface characteristic field 302 indicates the user interface characteristic associated with the panel. Thus, the panel 310 is associated with a display brightness of the mobile device 200.

The sensor field 304 indicates the set of sensor fields that can be associated with the user interface characteristic of the panel. Thus, in the illustrated embodiment of FIG. 3, panel 310 indicates that the microphone, camera, temperature sensor, and GPS sensor of the mobile device 200 can each be associated with the display brightness characteristic. By associating a particular sensor with the user interface characteristic, the user indicates that the interface control module 230 should determine whether to adjust the user interface characteristic based on information provided by the associated sensor.

As illustrated, each sensor includes an associated checkbox, such as checkbox 307. By interacting with the GUI 300, the user can select and set each checkbox. By setting a checkbox with an "X" or other marker, the user indicates that the corresponding sensor is to be associated with the user interface characteristic for the panel. Thus, in the illustrated example of FIG. 3, panel 310 indicates that the microphone and camera are each to be associated with the display brightness characteristic. Accordingly, the interface control module 230 will determine whether to adjust the brightness of the device display based on ambient sound, as indicated by the microphone, and ambient light, as indicated by the camera. The interface control module 230 will not determine whether to adjust the brightness of the mobile device 200 based on temperature information or geographic information, as the user has not placed the appropriate mark in the checkboxes associated with those sensors.

Each of the panels 310 and 312 also includes a characteristic option field 306. This field indicates to the interface control module 230 how the user interface characteristic should be set based upon the sensed ambient characteristics. Thus, for example, panel 312 indicates that a ring tone labeled "Ringtone1" should be selected if the camera and GPS sensor indicate that a change in ring tone is appropriate.

It will be appreciated that the GUI 300 could be configured in a number of different ways apart from the specific embodiment illustrated at FIG. 3. For example, rather than employing checkboxes, the GUI could provide a set of selectable menus. Further, option information could be displayed via icons, rather than through textual displays.

Figure 4:
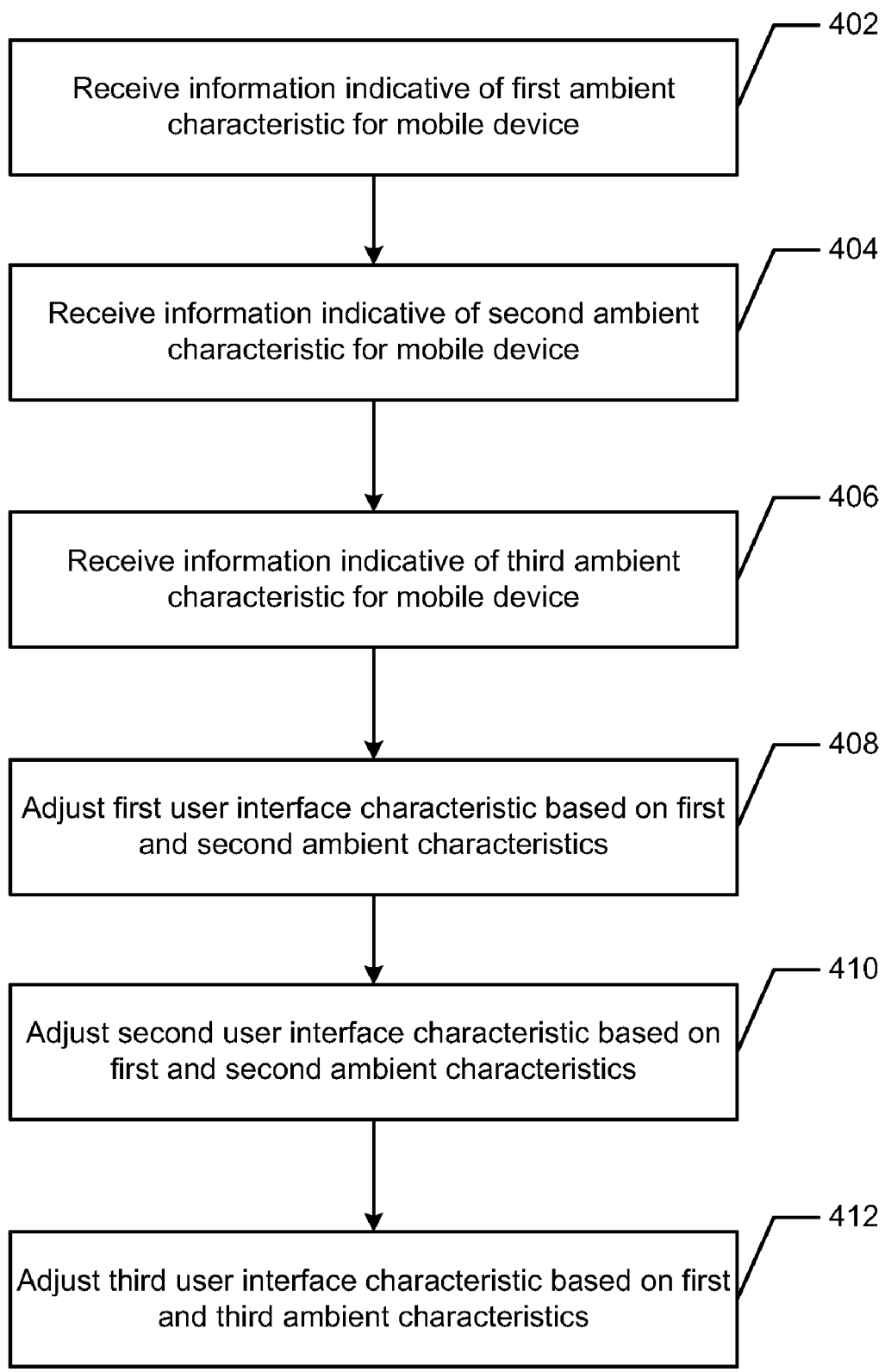
FIG. 4 is a flow diagram of a method of adjusting a user interface characteristic of a mobile communication device in accordance with one embodiment of the present disclosure.

FIG. 4 illustrates a flow diagram of a particular embodiment of a method of adjusting a user interface characteristic of a mobile device. At block 402, information indicative of a first ambient characteristic of a mobile device is received. At block 404, information indicative of a second ambient characteristic of the mobile device is received. At block 406, information indicative of a third ambient characteristic of the mobile device is received. At block 408, a first user interface characteristic of the mobile device is adjusted based on the first and second ambient characteristics, as indicated by the received information. At block 410, a second user interface characteristic is adjusted based on the first and second ambient characteristics. At block 412, a third user interface characteristic is adjusted based on the first and third ambient characteristics. Thus, in the illustrated embodiment of FIG. 4, different user interface characteristics of a mobile device are adjusted based on different combinations of sensed ambient characteristics.

The illustrations of the embodiments describe herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method for sensing a plurality of ambient characteristics on a mobile device, comprising:
  associating a plurality of sensors on the mobile device with a first user interface characteristic via a user interface;

receiving first information from a first sensor among the plurality of sensors, the first information indicative of a first ambient characteristic of the mobile communication device;

receiving second information from a second sensor among the plurality of sensors, the second information indicative of a second ambient characteristic of the mobile communication device; and setting the first user interface characteristic of the mobile communication device based on the first information and the second information.

2. The method of claim 1, wherein the user interface characteristic comprises a brightness associated with a display of the mobile communication device.

3. The method of claim 1, wherein the user interface characteristic comprises a brightness associated with a button light of the mobile communication device.

4. The method of claim 1, wherein the user interface characteristic comprises a volume associated with a speaker of the mobile communication device.

5. The method of claim 1, wherein setting the first user interface characteristic comprises selecting a ring tone from a plurality of available ringtones based on the first information and the second information.

6. The method of claim 1, wherein setting the first user interface characteristic comprises selecting one of a plurality of user-programmable device profiles based on the first information and the second information.

7. The method of claim 1, wherein the first sensor comprises a camera.

8. The method of claim 1, wherein the first sensor indicates a geographic location of the mobile communication device.

9. The method of claim 8, wherein the first sensor is a global positioning system (GPS) sensor.

10. The method of claim 1, wherein the first sensor is a microphone of the mobile communication device.

11. The method of claim 1, wherein the first sensor is a temperature sensor.

12. The method of claim 1, wherein the first ambient characteristic is of a first ambient characteristic type and the second ambient characteristic is of a second ambient characteristic type.

13. The method of claim 1, further comprising setting a second user interface characteristic based on the device profile.

14. A method for sensing a plurality of ambient characteristics on a mobile device, comprising:

associating a plurality of sensors on the mobile device with a brightness setting via a user interface;

receiving first information from a first sensor among the plurality of sensors, the first information indicative of a first ambient characteristic of the mobile communication device;

receiving second information from a second sensor among the plurality of sensors, the second information indicative of a second ambient characteristic of the mobile communication device; and adjusting the brightness setting of the display of the mobile communication device based on the first information and the second information.

15. The method of claim 14, further comprising setting a ring volume of the mobile communication device based on the first information.

16. The method of claim 14, further comprising setting a ring tone of the mobile communication device based on the first information.

17. The method of claim 14, wherein the first sensor comprises a camera.

18. The method of claim 14, wherein the first sensor comprises a microphone.

19. The method of claim 14, wherein the first sensor comprises a geographic position sensor.

20. A method, comprising:

associating a plurality of sensors on a mobile device with a first user interface characteristic via a user interface;

receiving from the plurality of sensors information indicative of a plurality of ambient characteristics of a mobile communication device; and setting the first user interface characteristic of the mobile communication device based on the information.

21. The method of claim 20, further comprising setting a second user interface characteristic of the mobile communication device based on the information.

22. A mobile communication device, comprising:

a first sensor configured to sense a first ambient characteristic of the mobile communication device;

a second sensor configured to sense a second ambient characteristic of the mobile communication device; and a control module configured to set a first user interface characteristic of the mobile communication device based on the first ambient characteristic and the second ambient characteristic;

wherein the control module further enables a user to associate and dissociate one or more of the first and second sensors with the first user interface characteristic via a user interface.

23. The mobile communication device of claim 22, further comprising:

a display device, wherein the first user interface characteristic comprises a brightness of the display device.

* * * * *